Inventor
GORDON CAVELL COX
By Rose & Edell
Attorneys

United States Patent Office 3,752,727
Patented Aug. 14, 1973

3,752,727
DIES FOR HIGH FREQUENCY WELDING
AND CUTTING
Gordon Cavell Cox, Rushden, England, assignor to Cox
& Wright Limited, Northamptonshire, England
Filed Feb. 23, 1971, Ser. No. 118,109
Claims priority, application Great Britain, Feb. 23, 1970,
8,632/70
Int. Cl. B29c 27/04; B32b 31/18
U.S. Cl. 156—510
5 Claims

ABSTRACT OF THE DISCLOSURE

In a welding electrode and cutting die assembly, for the high frequency electric welding and cutting of heat sealable plastic sheet materials, the welding electrode is carried by a support plate which is spring-urged toward a base plate upon which the cutting knife is fixedly secured. The base plate also carries a plurality of fluid-pressure operated rams acting on the support plate so that, when the fluid pressure is applied, the rams thrust the support plate away from the base plate and cause the electrode work-engaging face to protrude beyond the knife edge.

---

This invention relates to dies adapted for both high frequency electric welding and cutting of heat-sealable plastic workpieces.

The welding and cutting of plastic materials having a reinforcing laminate, such as nylon or terylene, usually follows one of two procedures.

The simplest way is to construct the die as a solid unit having its cutting edge in advance of the welding electrode area. The welding seam formed by the electrode may be a plain embossed line or may be patterned, e.g. with imitation stitch markings, but in either case the differential in height between the cutting edge and the electrode is critical and does not allow for much variation in the thickness of the work materials.

Thin laminates, or indeed any workpieces for which the weld pressure exceeds the cutting pressure, are particularly difficult to weld and cut in this manner as there is a likelihood of the cutting edge penetrating the material before welding has taken place. If the differential in height is reduced in an effort to obtain a weld, the weld area then prevents the component from being cut out clearly. Moreover, undue strain is put upon the press as the material is under compression at the moment of cutting.

An alternative method is used to try and overcome the problem, and this is to have the welding electrode area of the die spring-loaded either by springs or rubber. The welding electrode area in this case protrudes beyond the cutting edge and during the cutting stroke compression of the springs allows the die to cut.

This method also has disadvantages and, as in the previous case, the problem grows with the size of the work. The spring-loaded die must be constructed so as to withstand the pressure required for welding and then when the cutting action takes place this spring pressure must be overcome.

Both procedures require a press of higher tonnage than is necessary when the two actions of welding and cutting are performed independently of one another. It is therefore an object of the present invention to provide an improved die that does not suffer from these disadvantages.

According to the present invention, the welding electrode, which is movably mounted on the die assembly, is extendible and retractable in a controlled manner, in relation to the cutting knife, during the cycle of operations, powered means such as jacks being provided for this purpose.

The welding electrode can thus be extended to protrude beyond the knife edge during the welding operation, after which it can be retracted so as to leave the knife projecting for performance of the cutting operation.

Figure 1:
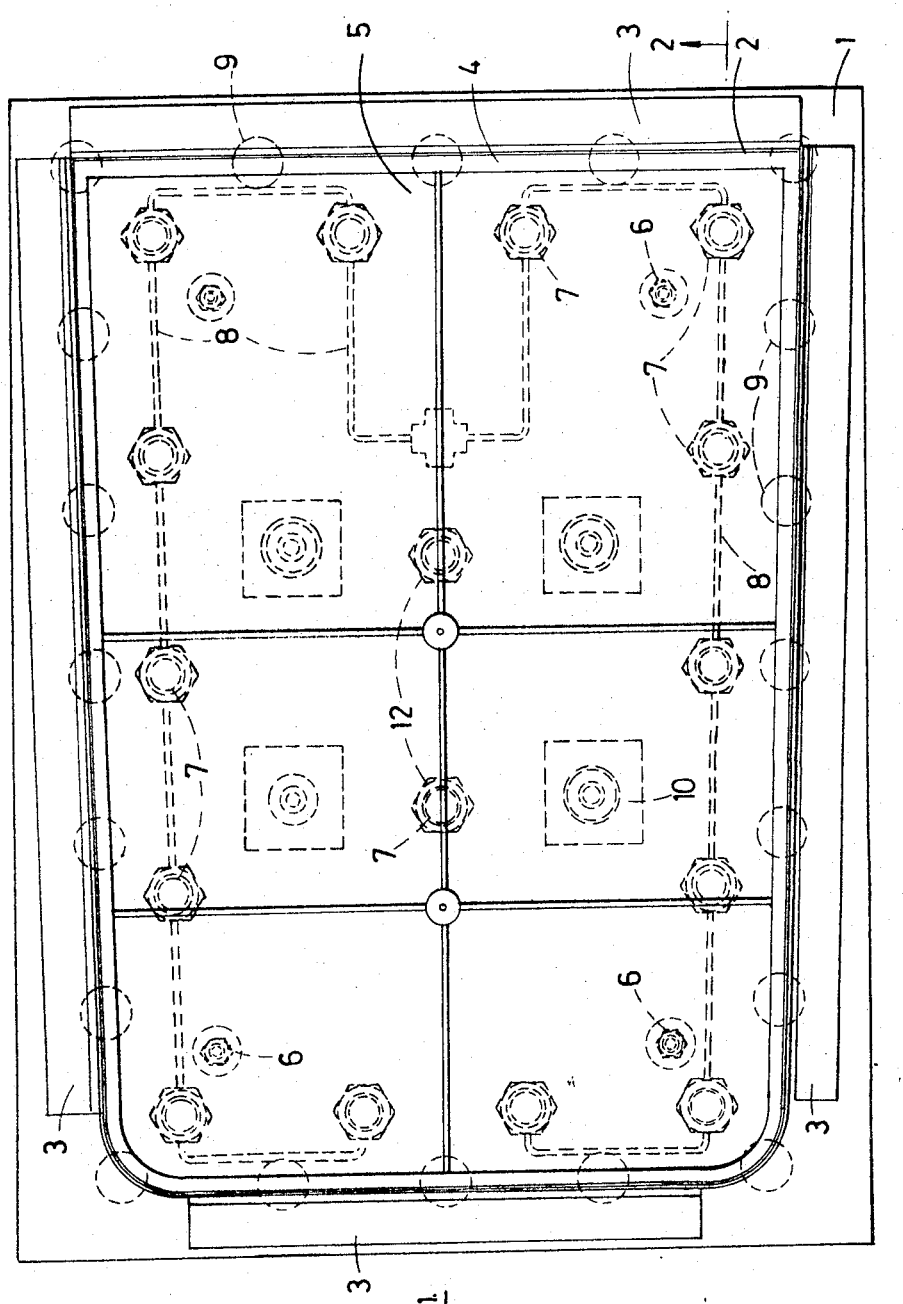
Figure 2:
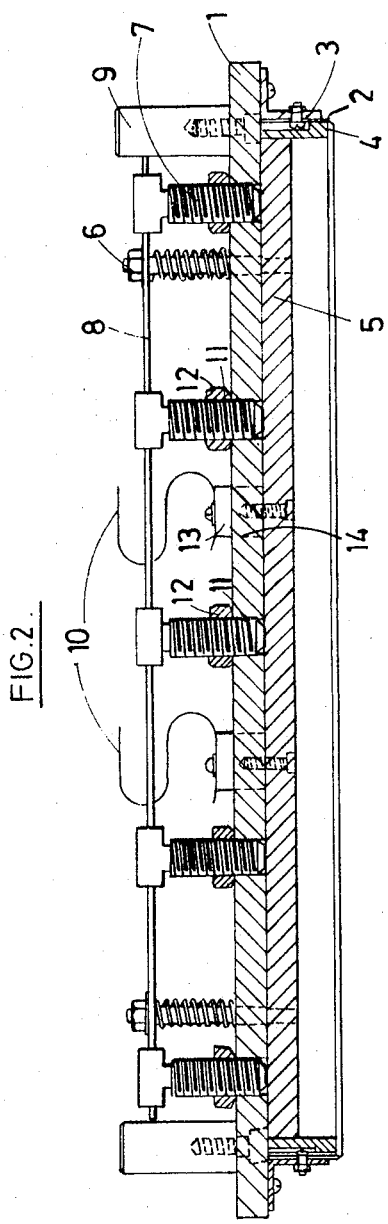
Figure 3:
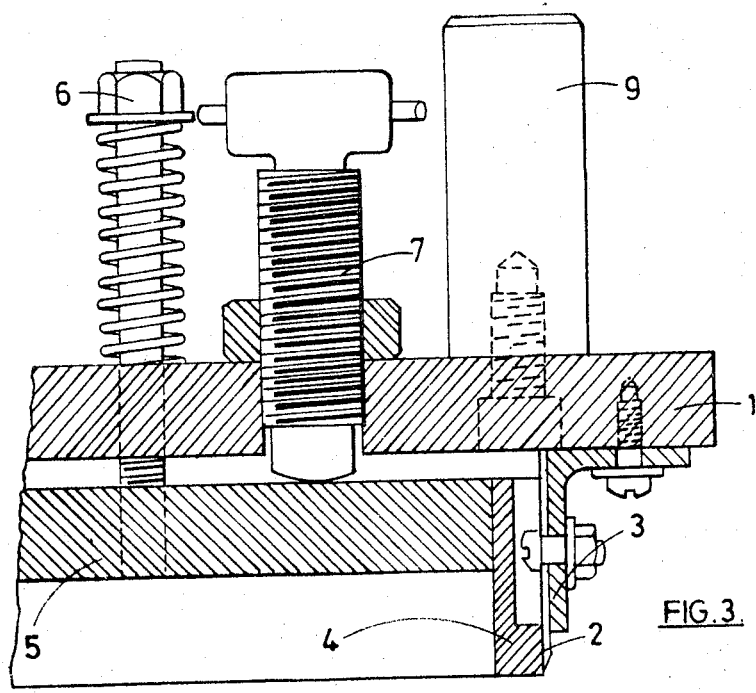
Figure 4:
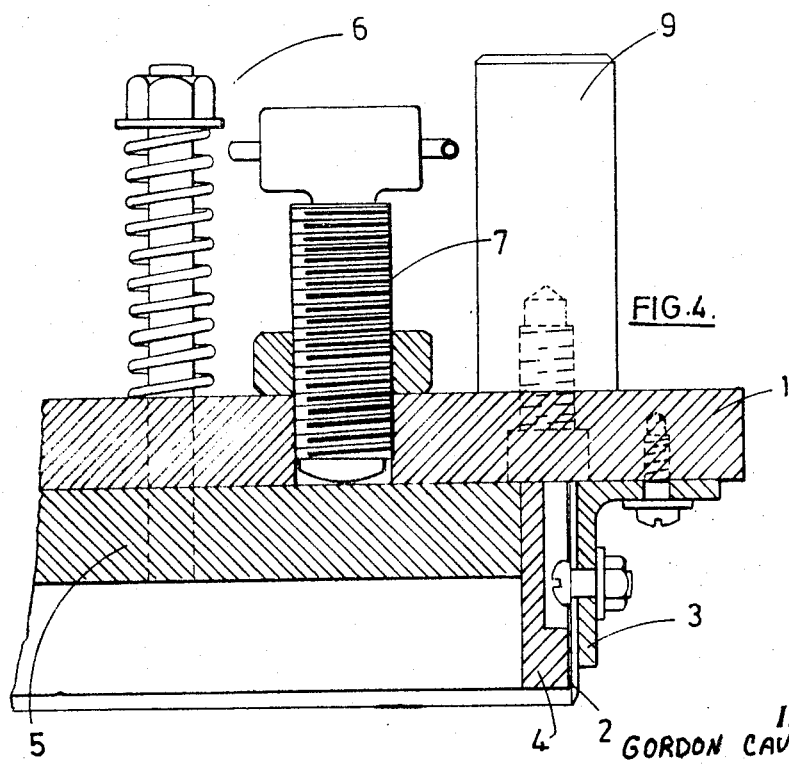

One arrangement in accordance with the invention will now be described by way of example, with reference to the accompanying drawings, in which:

FIG. 1 is an underneath plan view of the welding and cutting assembly to be described, FIG. 2 is an elevation in section on the line 2—2 of FIG. 1, and FIGS. 3 and 4 are partial elevations similarly in section, to illustrate two operating stages.

The die assembly shown in the drawings is built upon a base plate 1, on one side of which is mounted the perimeter strip knife 2 which is fixedly secured to angle supports 3. Within the perimeter of the knife edge, the welding electrode 4 is mounted on its own support plate 5 and held in position and in contact with the base plate 1 by means of spring-loaded studs 6 passing through the base plate 1. When the support plate 5 is in contact with the base plate 1, the knife edge 2 protrudes beyond the welding electrode 4.

On the reverse side of the base plate 1 a number of hydraulically-operated jacks 7 are fitted; these are distributed so as to exert an even thrust, when extended, over the whole area to be welded. The jacks 7, which are small ram-and-cylinder units, are connected to a common fluid pressure feed line 8. The cylinders of the jacks are screw-threadedly received in holes 11 in the base plate 1 and locked in position by nuts 12.

In use, the complete die assembly is attached to the head of the press with support pillars 9 in contact with the press buffer. Springy S shaped copper contacts 10 are used to carry the R.F. current to the welding electrode 4, these contacts being connected to plungers 13 that extend through holes 14 in the base plate 1 and are secured to the support plate 5.

FIG. 3 shows the die in readiness for welding. The jacks 7 are extended under fluid power causing the welding electrode 4 to project below the cutting edge 3. The spring-loading on the studs 6 holds back the electrode support plate 5 against the extended jacks 7. At this stage the force exerted by the jacks 7 is well in excess of the pressure required for welding. The die remains in this condition until the end of the welding and cooling cycle.

When the cutting action is to take place the jack fluid pressure is released allowing the jacks 7 to retract, followed by the welding electrode 4. The knife edge can now cut clearly without having to overcome spring pressures and without interference from the electrode having to compress the work.

FIG. 4 shows the die assembly during the cutting stroke, the welding electrode 4 being retracted and the knife edge 2 protruding to allow the cut to take place.

A further advantage is that the time of retraction of the electrode from the work can be controlled in relation to the switch-off time of the R.F. supply. This is useful in forming a rolled over edge on the work. Also, after severing of the work, the extension of the electrode by the jacks gives reliable automatic ejection of the workpiece.

Whereas in the arrangement described hydraulic jacks are employed for the extension and retraction of the welding electrode, it is also possible to achieve the same result by purely mechanical rather than hydraulic action.

What I claim is:

1. A welding electrode and cutting die assembly for the high frequency electric welding and cutting of heat-sealable sheet workpieces, comprising a base member, a cutting knife secured to said base member, an electrode-support member, a work-engaging welding electrode secured to said electrode-support member, said electrode-support member being mounted on said base member in such manner as to be raisable and lowerable within limits with respect to the base member and cutting knife, the knife edge protruding beyond the work-engaging surface of the electrode when the base member and the support member are in the condition of closest mutual proximity, and externally powered actuator means coupled between the base member and the support member to selectably and controllably shift the support member and electrode vertically relatively to the base member and cutting knife and so cause the welding electrode to protrude beyond the knife edge.

2. A welding electrode and cutting die assembly for the high frequency electric welding and cutting of heat-sealable sheet workpieces, comprising a base plate, a cutting knife rigidly secured to said base plate, an electrode-support plate, a work-engaging welding electrode rigidly secured to said electrode-support plate, said electrode-support plate being mounted on said base plate in such manner as to be raisable and lowerable within limits with respect to said base plate, the knife edge protruding beyond the work-engaging surface of the electrode when the base plate and the electrode and support plate are in the condition of closest mutual proximity, spring means urging the support plate toward the base plate, and a plurality of fluid-pressure-operated jacks mounted on said plate and acting on said electrode support plate to selectively and controllably shift the support plate away from the base plate against the spring action and so cause the welding electrode to protrude beyond the knife edge.

3. An assembly according to claim 2, wherein the cylinders of the jacks are screw-threadedly received in holes in the base plate.

4. An assembly according to claim 2, wherein the cutting knife is a perimeter knife surrounding the electrode, and the jacks are distributed to apply a substantially even pressure to the electrode greater than the welding pressure.

5. An assembly according to claim 2, wherein a high frequency electrical supply is conducted to the electrode by means of springy contacts attached to plungers working in apertures in the base plate.

References Cited

UNITED STATES PATENTS

| | | | |
|---|---|---|---|
| 2,153,351 | 4/1939 | Steinberger | 156—515 X |
| 3,334,004 | 8/1967 | Faust et al. | 156—515 X |
| 3,522,133 | 7/1970 | Gross | 156—515 |
| 2,425,388 | 8/1947 | Oestricher | 156—515 |
| 2,631,646 | 3/1953 | Gannon et al. | 156—380 |
| 3,099,596 | 7/1963 | Prew | 156—380 |
| 3,681,176 | 8/1972 | Reifenhauser | 156—515 X |
| 3,687,787 | 8/1972 | Grand et al. | 156—510 X |
| 3,697,357 | 10/1972 | Obeda | 156—510 |

FOREIGN PATENTS

| | | | |
|---|---|---|---|
| 322,176 | 11/1929 | Great Britain | 156—515 |

HAROLD ANSHER, Primary Examiner

U.S. Cl. X.R.

156—380, 530